US009195762B2

(12) United States Patent
Kruglick

(10) Patent No.: US 9,195,762 B2
(45) Date of Patent: Nov. 24, 2015

(54) OBSERVER FILTERED ACTIVITY RECOMMENDATIONS

(71) Applicant: EMPIRE TECHNOLOGY DEVELOPMENT LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/383,720

(22) PCT Filed: Apr. 8, 2014

(86) PCT No.: PCT/US2014/033360
§ 371 (c)(1),
(2) Date: Sep. 8, 2014

(65) Prior Publication Data
US 2015/0286728 A1  Oct. 8, 2015

(51) Int. Cl.
*G06F 17/30* (2006.01)
*G06Q 30/02* (2012.01)
*H04L 29/08* (2006.01)

(52) U.S. Cl.
CPC ...... *G06F 17/30867* (2013.01); *G06Q 30/0255* (2013.01); *H04L 67/22* (2013.01)

(58) Field of Classification Search
CPC .............. G06F 17/30867; H04L 67/22; G06Q 30/0255
See application file for complete search history.

(56) References Cited

U.S. PATENT DOCUMENTS

| 5,872,588 A | 2/1999 | Aras et al. |
| 8,108,778 B2 | 1/2012 | Athsani et al. |
| 2008/0172781 A1 | 7/2008 | Popowich et al. |
| 2011/0239245 A1 | 9/2011 | Croy et al. |
| 2012/0143693 A1 | 6/2012 | Chung et al. |
| 2012/0304206 A1 | 11/2012 | Roberts et al. |
| 2013/0159234 A1 | 6/2013 | Xing et al. |
| 2013/0259298 A1 | 10/2013 | Srinivasan et al. |
| 2013/0297698 A1* | 11/2013 | Odero et al. ................. 709/204 |
| 2014/0026158 A1 | 1/2014 | Rowe et al. |

OTHER PUBLICATIONS

Wikipedia, "Sentiment analysis," accessed at http://web.archive.org/web/20140402021020/http://en.wikipedia.org/wiki/Sentiment_analysis, accessed on Aug. 27, 2014, pp. 1-5.

(Continued)

*Primary Examiner* — William Spieler
(74) *Attorney, Agent, or Firm* — Jensen & Puntigam, PS

(57) ABSTRACT

Technologies related to observer filtered activity recommendations are generally described. In some examples, a computing device may collect activity and observer information for a device user, may identify limited observer activities, and may generate observer filtered activity recommendations for the device user, the observer filtered activity recommendations corresponding to the identified limited observer activities. Observer filtered activity recommendations may optionally be restricted in the presence of current observers outside a limited observer group. In some examples, the computing device may provide automated access to observer information and/or to observer filtered activity information to enable observer filtered activity recommendations by applications accessing the observer information and/or the observer filtered activity information.

30 Claims, 6 Drawing Sheets

(56) References Cited

OTHER PUBLICATIONS

Alchemyapi, "Text API: Sentiment Analysis," accessed at http://web.archive.org/web/20131222100913/http://www.alchemyapi.com/api/sentiment/textc.html, accessed on Aug. 27, 2014, pp. 1-8.

Barbera, M. V., et al., "Signals from the Crowd: Uncovering Social Relationships through Smartphone Probes," Proceedings of the 2013 conference on Internet measurement conference, pp. 265-276 (2013).

Frank, J., et al., "Generating Storylines from Sensor Data," Pervasive and Mobile Computing, vol. 9, No. 6 (2013), 5 pages.

Godbole, N., et al., "Large-scale Sentiment Analysis for News and Blogs," In Proceedings of the International Conference on Weblogs and Social Media (ICWSM) (2007), 4 pages.

International Searching Authority, International Search Report and Written Opinion for counterpart International Patent Application No. PCT/US2014/033360 mailed Aug. 15, 2014, 6 pages.

Knappmeyer, M., et al., "Survey of Context Provisioning Middleware," IEEE Communications Surveys & Tutorials 15, No. 3, pp. 1492-1519 (2013).

Lane, N. D., et al., "Hapori: Context-based Local Search for Mobile Phones using Community Behavioral Modeling and Similarity," 12th International Conference on Ubiquitous Computing, pp. 1-10 (2010).

Lathia, N., et al., "Smartphones for Large-Scale Behavior Change Interventions," IEEE Pervasive Computing 12, No. 3, pp. 2-9 (2013).

Ma, C., et al., "Top-k Similarity Search on Uncertain Trajectories," SSDBM vol. 6809, pp. 589-591 (2011).

McInerney, J., et al., "Breaking the Habit: Measuring and Predicting Departures from Routine in Individual Human Mobility," Pervasive and Mobile Computing, vol. 9, No. 6 (2013), 25 pages.

Mullen, T., and Collier, N. "Sentiment Analysis Using Support Vector Machines with Diverse Information Sources," In Proceedings of EMNLP (2004), 7 pages.

Nasukawa, T., and Yi, J., "Sentiment Analysis: Capturing Favorability Using Natural Language Processing," In Proceedings of the 2nd International Conference on Knowledge Capture, pp. 70-77. ACM, 2003.

Pang, B., and Lee, L., "A Sentimental Education: Sentiment Analysis Using Subjectivity Summarization Based on Minimum Cuts," In proceedings of the 42nd Annual Meeting on Association for Computational Linguistics, Association for Computational Linguistics (2004), 8 pages.

Pang, B., and Lee, L., "Opinion Mining and Sentiment Analysis," Foundations and Trends in Information Retrieval 2, No. 1-2 (2008), 94 pages.

Pearce, R., "Wi-Fi sniffing lets researchers take social snapshots of crowds," accesssed at http://www.techworld.com.au/article/526903/wi-fi_sniffing_lets_researchers_take_social_snapshots_crowds/, Sep. 19, 2013, 2 pages.

Wilson, T., et al., "Recognizing Contextual Polarity in Phraselevel Sentiment Analysis," In Proceedings of the Conference on Human Language Technology and Empirical Methods in Natural Language Processing, Association for Computational Linguistics (2005), 8 pages.

Zheng, Y., et al., "SHARP: Private Proximity Test and Secure Handshake with Cheat-Proof Location Tags," Computer Security—ESORICS (2012), 18 pages.

Attivio, "Sentiment analysis," accessed at www.attivio.com/products/add-on-modules/sentiment-analysis.html, Nov. 3, 2013, 3 pages.

Hill, "How to Get the Best Out of Google Now," accessed at http://www.digitaltrends.com/mobile/how-to-use-google-now/, May 22, 2013, 8 pages.

* cited by examiner

OBSERVER FILTERED ACTIVITY RECOMMENDATIONS

CROSS-REFERENCE TO RELATED APPLICATION

This is a U.S. National Stage filing under 35 U.S.C. 371 of International Application PCT/US14/33360, entitled "OBSERVER FILTERED ACTIVITY RECOMMENDATIONS", filed on Apr. 8, 2014 which is incorporated by reference herein in its entirety.

BACKGROUND

Unless otherwise indicated herein, the materials described in this section are not prior art to the claims in this application and are not admitted to be prior art by inclusion in this section.

Interactions with computing devices, applications, and services are becoming increasingly personalized. For example, TV shows, movies, videos, advertisements, music, news, activities, events, humor, search queries and search results can be usefully recommended to computer users based on user history and/or other user information.

Moreover, many of today's computing devices are mobile and are equipped with a variety of sensors. For example, the various IPHONE® devices made by Apple Inc., the various devices equipped with ANDROID® software made by Google Inc., and the various devices equipped with WINDOWS PHONE® software made by Microsoft Corp. are often equipped with technologies such as Global Positioning System (GPS) technologies and accelerometers. Such technologies allow for collecting additional user information, e.g., location history and accelerometer data, which can be leveraged to make additional types of recommendations. Such technologies also allow for increased utility and level of personalization of recommendations in general.

Personalized recommendations may be generally considered desirable by computer users as well as commercial interests. Computer users may want personalized recommendations because they allow for faster identification of relevant, useful information. Commercial interests appreciate that personalized recommendations can drive increased economic activity and goodwill. Notwithstanding, there may be ongoing concerns about user privacy, and such concerns can affect desirability of opting into disclosures needed for more personalized recommendations.

SUMMARY

The present disclosure generally describes technologies including devices, methods, and computer readable media relating to observer filtered activity recommendations. Some example methods may comprise: making observer filtered activity recommendations by a computing device, e.g., by collecting activity information for activities engaged by a device user; collecting observer information comprising observers proximal to the device user when the activities are engaged; storing collected activity information and collected observer information; identifying, based on the collected observer information, limited observer activities among the collected activity information; and generating, for the device user, observer filtered activity recommendations corresponding to the limited observer activities. Some embodiments may time observer filtered activity recommendations to occur when the device user is in private or in presence of a limited set of observers, thereby protecting device user privacy with respect to current observers.

Some embodiments may store sentiment information for activities, e.g., positive or negative sentiment scores. When a limited observer activity is a positive activity associated with a positive sentiment score, observer filtered activity recommendations may comprise recommendations to engage in the positive activity, such as advertisements for products or services to engage in the positive activity. Conversely, when a limited observer activity is a negative activity associated with a negative sentiment score, observer filtered activity recommendations may comprise recommendations to assist in preventing the negative activity, such as advertisements for products or services to assist in preventing the negative activity. Embodiments may thereby assist in detecting behaviors that a device user may want to change, and may assist in preventing or changing such behaviors.

Some example methods may comprise providing, by a computing device, automated access to observer filtered activity information. Such methods may enable, inter alia, providing observer filtered activity information to applications executable by the computing device, allowing the applications to make observer filtered activity recommendations while simultaneously protecting device user privacy.

To enable automated access to observer filtered activity information, the computing device may store activity information for activities engaged by a device user, and observer information comprising observers proximal to the device user when the activities are engaged. Limited observer activities may be identified among the activity information, based on the observer information. The computing device may receive requests for activity information and determine, in response to activity information requests, whether the requested activity information comprises a limited observer activity.

When requested activity information comprises a limited observer activity, the computing device may restrict activity information provided in response to the request. Example approaches for restricting activity information include comparing current observer information to observer information corresponding to the limited observer activity, and/or displaying a permission User Interface (UI) comprising a request for device user permission to provide the requested activity information. The computing device may automatically provide the requested activity information in response to the request subject to restriction when the requested activity information comprises a limited observer activity.

Some example methods may comprise collecting and providing observer information by a computing device. Such methods may enable, inter alia, automatically providing observer information to applications executable by the computing device. The applications may be allowed to trigger observer collection events and/or request observer information, e.g., to make observer filtered activity recommendations.

Methods to collect and provide observer information may comprise: collecting, by the computing device, at observer collection events, observer information comprising identifications of observers proximal to a device user; storing collected observer information from the observer collection events; receiving observer information requests; and automatically providing, in response to observer information requests, one or more of: requested observer information corresponding to observer collection events identified in the observer information requests, or indications of whether current observer information matches stored observer information corresponding to observer collection events identified in the observer information requests.

Computing devices and computer readable media having instructions implementing the various technologies described herein are also disclosed. Example computer readable media may comprise non-transitory computer readable storage media having computer executable instructions executable by a processor, the instructions that, when executed by the processor, cause the processor to carry out any combination of the various methods provided herein. Example computing devices may include a server comprising a processor, a memory, and an observer filtered activity recommendation system, an interface for automated access to observer filtered activity information, and/or an interface for automated access to collected observer information configured to carry out the methods described herein.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
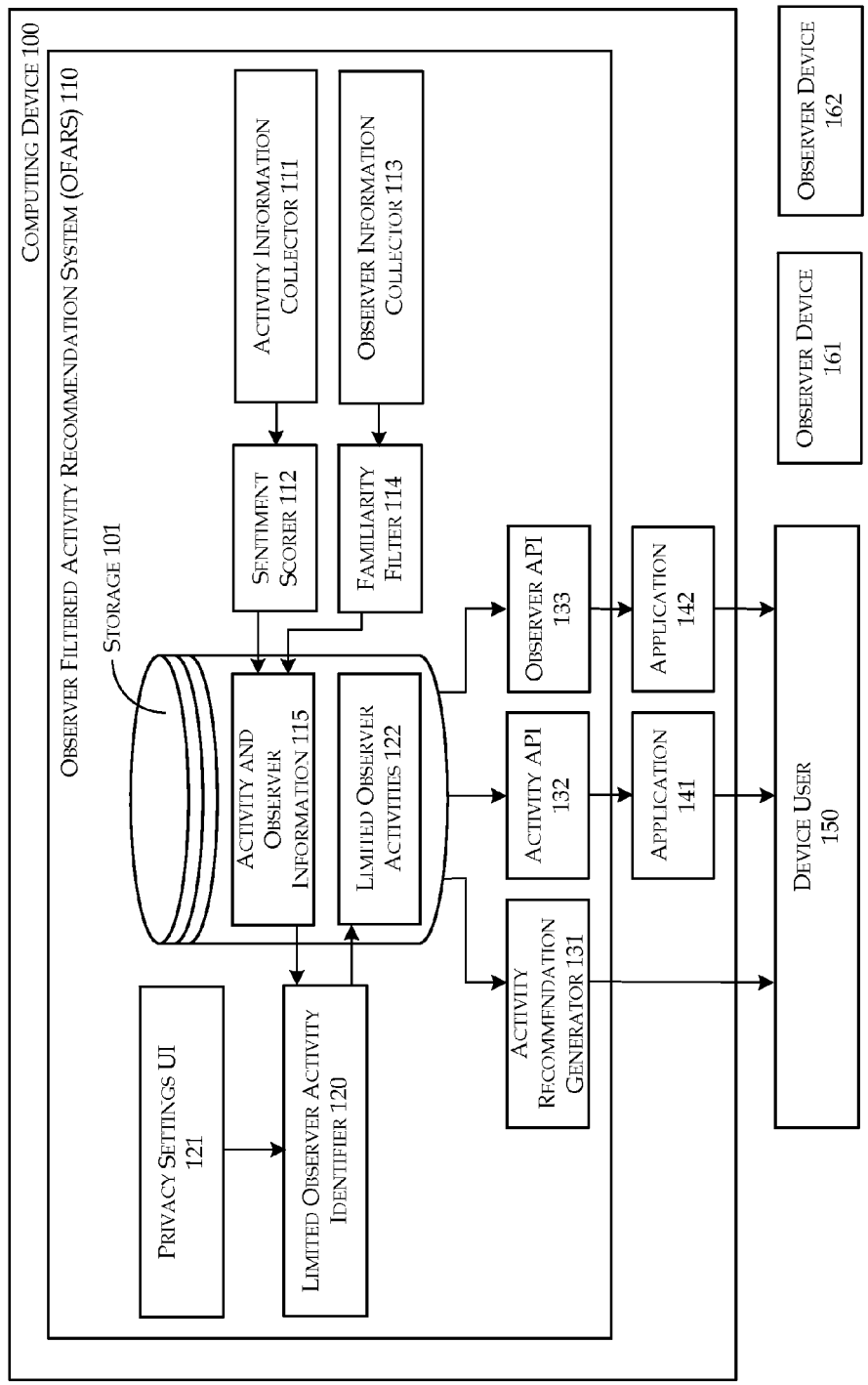
FIG. 1 is a block diagram of an example computing device equipped with an observer filtered activity recommendation system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and made part of this disclosure.

The present disclosure is generally drawn, inter alia, to technologies including methods, devices, systems and/or computer readable media deployed therein relating to observer filtered activity recommendations. In some examples, a computing device may collect activity and observer information for a device user, identify limited observer activities, and generate observer filtered activity recommendations for the device user corresponding to the limited observer activities. Observer filtered activity recommendations may optionally be restricted in the presence of current observers outside a limited observer group. In some examples, the computing device may provide automated access to observer information and/or to observer filtered activity information to enable observer filtered activity recommendations by applications accessing the observer information and/or the observer filtered activity information.

In one example scenario, an adult may secretly enjoy the music of a teen pop idol. The adult may frequently use her mobile device to listen to the teen music. Her mobile device is an example computing device, she is an example device user, and the act of listening to teen music is an example of an activity for which activity information may be collected by her mobile device.

Her mobile device may furthermore collect observer information when she listens to teen music. Observer information may comprise information indicative of persons proximal to the device user. In some embodiments, observer information may comprise a total count of persons proximal to the device user, or a best approximation of such a total count of persons. Observer information may comprise, e.g., a total count such as 0, 1, 2, 3 . . . total observers. In some embodiments, observer information may comprise identifications indicative of persons proximal to the device user—e.g., where an identifier may be collected for each separate observer. Identifiers may comprise, for example, any assigned identifiers. In some embodiments, identifiers may comprise names of persons proximal to the device user and/or identifiers for observer devices proximal to the device user (e.g., devices typically carried by persons such as mobile phones). Observer information may or may not always be complete, however, incomplete observer information may nonetheless be useful in connection with embodiments of this disclosure.

A variety of observer information collection techniques are described herein, e.g., in some embodiments, the device user's mobile device may use a wireless signal sensor to detect presence of observer devices. Collected activity and observer information may be stored, either at the mobile device or at another location such as at a server. For simplicity of explanation, this example will continue to use the mobile device as the example computing device, with the understanding that different or additional devices may be employed in some embodiments.

The mobile device may use collected activity and observer information to identify limited observer activities. Limited observer activities may comprise activities for which observers are limited, as determined from collected activity and observer information. For example, observer information for multiple instances of a given activity may reveal that observers are limited for the given activity. In some examples, observers may be limited in number, and such limited observer activities are referred to herein as solitary type limited observer activities. In some examples, observers may be limited to any observer property, such as observer gender or other observer group affiliation, and such limited observer activities are referred to herein as group type limited observer activities.

For example, the mobile device may determine from analysis of multiple instances of listening to teen music, that observers are almost never present for that activity (in which case listening to teen music is a solitary type limited observer activity), or that certain observers are almost never present for that activity (in which case listening to teen music is a group type limited observer activity). Those certain observers may correspond to certain individuals familiar to the device user, or for example to her friends, her family, or her work colleagues as a group. Conversely, in some embodiments, the mobile device may use collected activity and observer information to identify unlimited observer activities, such as activities performed multiple times in the presence of a variety of different observers, or for example any activities other than identified limited observer activities.

In some embodiments, identifying limited observer activities may comprise identifying solitary type limited observer activities, such as where a device user typically engages the activity alone or else in the presence of fewer than a predetermined number of observers. In some embodiments, identifying limited observer activities may comprise identifying group type limited observer activities, such as where a device user typically engages the activity in the presence of a limited set of observers, which may be limited to specific individual observers, or to a group affiliation such as family observers or work observers. Identification of limited observer activities as a solitary or group type limited observer activities may be used in generating observer filtered activity recommendations, e.g., in determining observer filtered activity recommendation content and/or timing.

In some embodiments, identification of limited observer activities, as well as determinations regarding properties of limited observer activities, may be user assisted. For example, the mobile device may provide a privacy settings UI comprising controls adapted to confirm or deny that certain activities are limited observer activities. In some embodiments, the privacy settings UI may comprise controls adapted for device user indications of allowed observers for identified limited observer activities.

The mobile device may generate observer filtered activity recommendations for identified limited observer activities. Observer filtered activity recommendations may comprise, e.g., activity suggestions and/or advertisements for products or services associated with limited observer activities. For example, in the case of listening to teen music, observer filtered activity recommendations may comprise recommendations to listen to and/or advertisements to buy a recent release of a new teen pop idol recommendations or advertisements for upcoming teen music concerts or apparel, or for example recommendations or advertisements for activities correlated with teen music interest. Conversely, in some embodiments, the mobile device may generate observer filtered activity recommendations for identified unlimited observer activities. Activity recommendations may be considered as "observer filtered" if observer information is used in any way in connection with the decision to make the activity recommendation, or in connection with the content or timing of the activity recommendation.

Activity information for use in connection with embodiments of this disclosure may relate to any activities, and may be collected by any collection techniques. In some embodiments, activity information may comprise device user product selection information, for example, selections of tangible or intangible products or services such as music, videos, movies, books, magazines, subscriptions, news, humor, electronics, medicines, medical services, legal services, financial services, financial products such as stocks and bonds, airfare, hotel rooms, meals, sporting goods, or any other products or services, or subcategories thereof such as, in the case of music, rock, heavy metal, classical, teen music, children's music, etc. Activity information may also comprise search queries and website visits, as well as subcategories thereof.

In some embodiments, activity information may comprise device user context activity determinations based on data collected at a device user's computing device, such as the mobile device in the present example scenario. Context activity determinations may comprise, e.g., determinations regarding physical world activities such as driving, walking, bicycling, flying, eating at a restaurant, drinking at a bar, smoking, sitting, shopping, gambling, doctor visits, attorney visits, visiting a friend, taking medications, etc. Services such as GOOGLE NOW® and SIRI® are currently able to make a variety of context activity determinations and they are expected to become ever more powerful at making such activity determinations in the future.

By collecting observer information for activities such as product selections, internet searches, and physical world activities, and by identifying limited observer activities from the observer information, embodiments may support observer filtered activity recommendations which may be targeted to potential device user sentiments regarding their various activities. For example, observer filtered activity recommendations comprising advertisements for teen music may have a strong emotional impact on a device user for whom teen music is a limited observer activity. In contrast, advertisements for music of another genre, which genre is not classified as a limited observer activity, may have less emotional impact on the device user. Embodiments may optionally also provide observer filtered activity recommendations at opportune times, e.g., when a device user is in private or otherwise outside the presence of any current observers beyond the set of limited observers associated with a limited observer activity.

Some embodiments may use sentiment information for limited observer activities to improve targeting of observer filtered activity recommendations to potential device user sentiments regarding their various activities. Sentiment information may be drawn from a variety of sources and may take a variety of forms. In some example embodiments, sentiment information may indicate positive or negative sentiment scores for limited observer activities. Positive or negative sentiment scores may be drawn from sentiment data designed to reflect general cultural sentiments about limited observer activities, or sentiment scores may be drawn from sentiment data designed to reflect sentiments associated with the device user's demographic, such as device user age, gender, ethnicity, geographic region, etc.

For example, unhealthy activities such as smoking, alcohol or drug use, or eating unhealthy foods may be associated with negative sentiment scores, while healthy activities such as listening to music and exercise may be associated with positive sentiment scores. Other embodiments may include sentiment information from other sources, e.g., embodiments may present device users with surveys designed to request device user sentiment scores for limited observer activities.

In some embodiments, when a limited observer activity is identified as a positive activity with a positive sentiment score, observer filtered activity recommendations may comprise recommendations to engage in the positive activity, such as in the example of recommending additional teen music for the device user. Conversely, when a limited observer activity is identified as a negative activity with a negative sentiment score, observer filtered activity recommendations may comprise recommendations to assist in preventing the negative activity. In this way, observer filtered activity recommendations may be based on both observer information as well as sentiment information to produce highly effective observer filtered activity recommendations.

In some embodiments, a familiarity filter may be applied to collected observer information, to differentiate between familiar and unfamiliar observers. By applying a familiarity filter, embodiments may more effectively identify limited observer activities, e.g., by eliminating or otherwise reducing the importance of unfamiliar observers in collected observer information.

In another example scenario, a device user may use his mobile device for personal as well as work-related purposes. His mobile device may be equipped with a variety of applications, such as a personal email application, a work email application, an e-reader application used to read both books for pleasure and a variety of work-related documents, a maps application, a personal banking application, etc. The device user may frequently use the e-reader to read politically themed books for pleasure, and he may prefer to not reveal his political views at work. Meanwhile, the e-reader may be equipped to make reading recommendations based on the device user's historical reading activity.

His mobile device may advantageously include an interface, such as an Application Programming Interface (API), for automated access to observer filtered activity information, referred to herein as an activity API. The activity API may enable applications, such as the e-reader, to make observer filtered activity recommendations.

For example, the e-reader may request activity information, such as historical reading activity, from the activity API. The activity API may receive the activity information request and may determine whether the requested activity information comprises a limited observer activity, such as politically themed books, which book genre may not typically be accessed while in proximity of work observers. When the requested activity information comprises a limited observer activity, the activity API may restrict activity information provided in response to the activity information request. For example, the activity API may omit historical reading activity related to politically themed books from activity information provided in response to the activity information request, when the device user is at work or in presence of work observers. When the requested activity information does not comprise a limited observer activity, the activity API may automatically provide the requested activity information in response to the activity information request.

A variety of different approaches may be used to restrict activity information provided in response to activity information requests. In some embodiments, restricting activity information may comprise determining current observer information, and comparing the current observer information to observer information corresponding to any limited observer activities identified in the requested activity information. In some embodiments, restricting activity information may comprise displaying a permission UI comprising a request for device user permission to provide the requested activity information in response to the activity information request. In some embodiments, restricting activity information may comprise removing activity information relating to limited observer activities under all circumstances. It will be appreciated with the benefit of this disclosure that a variety of other approaches may be employed for restricting activity information provided in response to activity information requests.

In some embodiments, the device user's mobile device may store activity and observer information, e.g., at the mobile device, for use in identifying limited observer activities and responding to activity information requests. For example, the mobile device may store activity and observer information in response to application-generated observer collection requests. In the e-reader application scenario, the e-reader may be adapted to make observer collection requests each time the e-reader is engaged to access reading material. The e-reader may optionally also optionally supply activity information, such as book title, genre, author, etc. to the activity API. The activity API may store the activity information, and may collect and store observer information, in response to received observer collection requests.

In some embodiments, the activity API may support application-specific information storage, wherein, for example, activity and observer information is stored separately for each application that accesses the activity API. Embodiments comprising an activity API may optionally protect device user privacy by not exposing observer information to applications, while nonetheless allowing applications to access observer filtered activity information and to make observer filtered activity recommendations.

In another example scenario, a device user may use his mobile device for personal as well as work-related purposes, as described above. However instead of, or in addition to, the activity API described herein, the mobile device may include an interface for automated access to collected observer information, referred to herein as an observer API. The observer API may expose observer information more directly to applications than the activity API, allowing applications to use the observer information to, e.g., identify limited observer activities and make observer-filtered activity recommendations.

In embodiments comprising an observer API, the mobile device may for example collect and store observer information in response to observer collection events. Example observer collection events may include, inter alia, application-generated observer collection requests, periodic observer collection events, and/or activity-based observer collection events. The observer API may be adapted to automatically provide observer information in response to observer information requests.

In some embodiments, observer information requests may comprise requests for observers present at one or more specific observer collection events, or at observer collection events of a specified type. In response to such observer information requests, the observer API may be adapted to provide the requested observer information, such as identifiers for observers detected at each observer collection event specified in an observer information request.

Applications that access observer information from the observer API may use the provided observer information to perform their own analyses of observer and activity correlations, for example to identify limited observer activities and/or make observer filtered activity recommendations as described herein. Applications may also find other new and useful ways to incorporate observer information supplied according to the teachings provided herein.

In some embodiments, observer information requests may comprise requests for current observer approval, e.g., requests to indicate whether current observer information matches stored observer information corresponding to one or more specific observer collection events, or to observer collection events of a specified type. In response to such current observer approval type observer information requests, the observer API may be adapted to provide indications of whether current observer information matches stored observer information corresponding to observer collection events identified in observer information requests.

FIG. 1 is a block diagram of an example computing device equipped with an observer filtered activity recommendation system, arranged in accordance with at least some embodiments of the present disclosure. FIG. 1 illustrates a computing device 100 equipped with an Observer Filtered Activity Recommendation System (OFARS) 110, an application 141 and an application 142. FIG. 1 also illustrates a device user 150, an observer device 161 and an observer device 162.

In general, OFARS 110 may be configured to store activity and observer information 115. Activity and observer information 115 may comprise activity information, including activities engaged by device user 150, and observer information, including observers present when activities are engaged. OFARS 110 may be configured to identify limited observer activities 122 among activity and observer information 115. In some embodiments, OFARS 110 may be configured to use limited observer activities 122 to generate observer filtered activity recommendations. In some embodiments, OFARS 110 may be configured to provide activity information to applications 141 and 142 while restricting activity information relating to limited observer activities 122, allowing applications 141 and 142 to generate observer filtered activity recommendations. In some embodiments, OFARS 110 may be configured to provide observer information to applications 141 and 142, allowing applications 141 and 142 to, e.g., identify limited observer activities and/or generate observer filtered activity recommendations.

In the example embodiment illustrated in FIG. 1, OFARS 110 comprises an activity information collector 111, a sentiment scorer 112, an observer information collector 113, a familiarity filter 114, a storage 101, a limited observer activity identifier 120, a privacy settings UI 121, an activity recommendation generator 131, an activity API 132, and an observer API 133. Storage 101 includes activity and observer information 115 and limited observer activities 122.

Activity information collector 111 may be configured to collect activity information for activities engaged by device user 150. Sentiment scorer 112 may be configured to apply sentiment scores to collected activity information. Observer information collector 113 may be configured to collect observer information, e.g., each time activity information is collected by activity information collector 111, and substantially simultaneously with activity information collection by activity information collector 111. Familiarity filter 114 may be configured to filter observer information collected by observer information collector 113, e.g., each time observer information is collected by observer information collector 113. OFARS 110 may be configured to store activity and observer information 115 resulting from collection, scoring, and filtering operations of activity information collector 111, sentiment scorer 112, observer information collector 113, and familiarity filter 114, in storage 101. In some examples, observer information collector 113 may identify observers by using radio communications, e.g. by using Wi-Fi to identify the MAC addresses of observer device 161 and/or observer device 162. Other examples for observer device identification include but are not limited to collecting Bluetooth identifiers or other device identifiers.

Limited observer activity identifier 120 may be configured to analyze activity and observer information 115 to identify limited observer activities 122. A privacy settings UI 121 may be configured to acquire device user 150 input in connection with identifying limited observer activities 122, and/or to establish properties, such as observer information, corresponding to limited observer activities 122. Limited observer activity identifier 120 may be configured to store limited observer activities 122 and properties thereof in storage 101.

In some embodiments, limited observer activity identifier 120 may be configured to identify limited observer activities 122 by ranking activities by observer counts, wherein the observer counts may be familiarity filtered as described herein. Limited observer activities 122 may comprise any activities having a number of observers that is below a threshold number of observers, as may be established over a plurality of instances of the activity in activity and observer information 115. The threshold number of observers may be, e.g., 1, 2, 3, 4 . . . observers. Embodiments may also rank limited observer activities 122 by number of observers, where limited observer activities 122 with fewer observers may be ranked above those with more observers.

In some embodiments, activity recommendation generator 131 may be configured to generate observer filtered activity recommendations for device user 150. In some embodiments, observer filtered activity recommendations may comprise, e.g., recommendations to engage in limited observer activities 122 and/or recommendations to assist in preventing limited observer activities 122. Conversely, observer filtered activity recommendations may comprise, e.g., recommendations to engage in "unlimited observer activities", e.g., activities in activity and observer information 115, other than limited observer activities 122.

In some embodiments, activity API 132 may be configured to provide automated access to observer filtered activity information from OFARS 110. Application 141 may be configured to request activity information from activity API 132. OFARS 110 may be configured to determine whether the requested activity information comprises any limited observer activities 122. When OFARS 110 determines that the requested activity information does not comprise limited observer activities 122, activity API 132 may be configured to automatically provide the requested activity information in response to the request.

When OFARS 110 determines that limited observer activity information 122 is requested by application 141, OFARS 110 may be configured to restrict activity information provided in response to the request. In some embodiments, OFARS 110 may be configured to limit activity information to information other than limited observer activity information 122. In some embodiments, OFARS 110 may be configured to check whether restriction requirements are met, such as by providing a permission UI for device user 150 approval, or by comparing current observer information to observer information corresponding to requested limited observer activities. OFARS 110 may be configured to automatically provide, via activity API 132, limited activity information and/or activity information meeting restriction requirements, to application 141 in response to requests.

Application 141 may be configured to make observer filtered activity recommendations to device user 150, wherein application 141 activity recommendations may be, e.g., based on activity information other than limited observer activities 122, or based limited observer activities 122 when restriction requirements such as device user 150 permission, or current observer requirements, are met.

In some embodiments, observer API 133 may be configured to provide automated access to observer information from OFARS 110. OFARS 110 may optionally be configured as an observer information system adapted to support observer API 133 without necessarily including one or more of the elements illustrated in FIG. 1. For example, in some embodiments OFARS 110 may provide an observer information system without limited observer activity identifier 120 and/or activity information collector. OFARS 110 may be configured to store observer information in response to any observer collection events, including activity-based observer collection events, requests from application 142 to observer API 133, and/or periodic collection events.

Application 142 may be configured to request observer information from observer API 133. In some embodiments, observer information requests may comprise requests for observer identifiers and/or observer counts from observer collection events. OFARS 110 may be configured to automatically provide, via observer API 133, requested observer information corresponding to observer collection events identified in observer information requests received from application 142.

In some embodiments, observer information requests may comprise current observer approval requests. OFARS 110 may be configured to provide, to application 142 via observer API 133, indications of whether current observer information matches stored observer information corresponding to observer collection events identified in observer information requests.

Application 142 may be configured to use observer information returned by observer API 133, e.g., to identify limited observer activities and/or to make observer filtered activity recommendations to device user 150. In some embodiments, application 142 may be configured to use indications responsive to current observer approval requests to time activity recommendations to occur in presence of appropriate current observers and/or to occur when device user 150 is in private.

In some embodiments, computing device 100 may comprise a mobile device such as an IPHONE®, ANDRIOD®, or WINDOWS MOBILE® type device. Mobile devices are increasingly equipped with personal assistants and other context systems equipped to identify activities of device users. In some embodiments, OFARS 110 may comprise a subcomponent of a context system such as GOOGLE NOW® and SIRI®, or OFARS 110 may be configured to interoperate with a context system. For example, activity information collector 111 may be configured to receive activity information from a context system, or a context system may serve as activity information collector 111 and a context system storage may serve as storage 101.

Elements of OFARS 110 may be implemented at a single computing device 100, as illustrated, or elements of OFARS 110 may be implemented at multiple different computing devices, and may be configured to communicate across networks as appropriate. For example, in some embodiments, activity information collector 111 and observer information collector 113 may be implemented at computing device 100, while the remaining elements of OFARS 110 may be implemented at a remote server computing device. Other embodiments may place any aspects of OFARS 110 at computing device 100, and any aspects of OFARS 110 at one or more remote server computing devices, as appropriate. Furthermore, OFARS 110 and/or elements of OFARS 110 such as activity information collector 111, sentiment scorer 112, observer information collector 113, familiarity filter 114, storage 101, limited observer activity identifier 120, activity recommendation generator 131, activity API 132, and observer API 133 may be configured to communicate with one or more remote server computing devices in the course of their operations at computing device 100.

Figure 2:
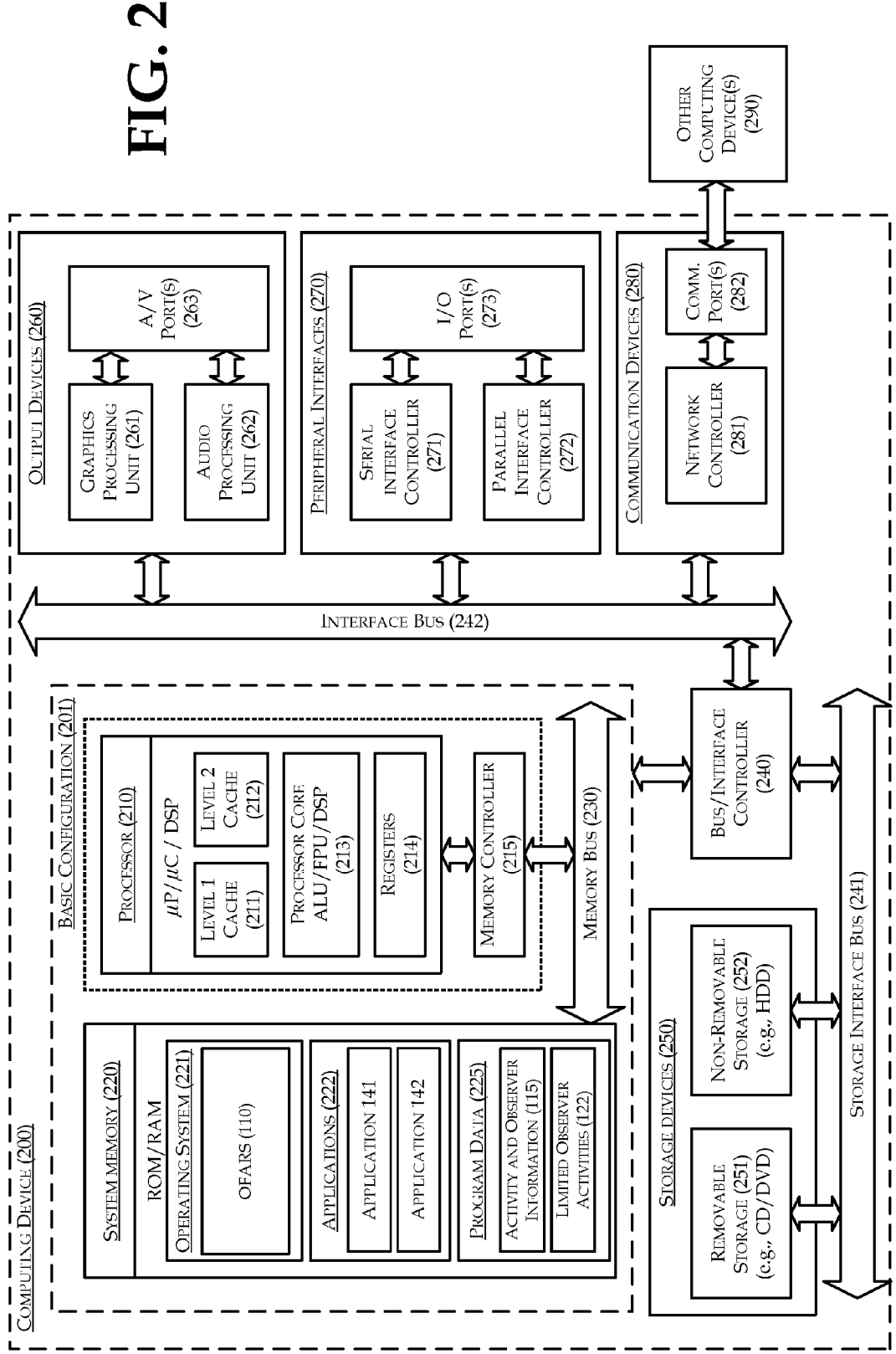
FIG. 2 is a block diagram of another example computing device equipped with an observer filtered activity recommendation system.

FIG. 2 is a block diagram of an example computing device 200 equipped with an observer filtered activity recommendation system, arranged in accordance with at least some embodiments of the present disclosure. In a very basic configuration 201, computing device 200 may include one or more processors 210 and system memory 220. A memory bus 230 may be used for communicating between the processor 210 and the system memory 220.

Depending on the desired configuration, processor 210 may be of any type including but not limited to a microprocessor (μP), a microcontroller (μC), a digital signal processor (DSP), or any combination thereof. Processor 210 may include one or more levels of caching, such as a level one cache 211 and a level two cache 212, a processor core 213, and registers 214. The processor core 213 may include an arithmetic logic unit (ALU), a floating point unit (FPU), a digital signal processing core (DSP Core), or any combination thereof. A memory controller 215 may also be used with the processor 210, or in some implementations the memory controller 215 may be an internal part of the processor 210.

Depending on the desired configuration, the system memory 220 may be of any type including but not limited to volatile memory (such as RAM), non-volatile memory (such as ROM, flash memory, etc.), or any combination thereof. System memory 220 typically includes an operating system 221, one or more applications 222, and program data 225. In some embodiments, operating system 221 may comprise a virtual machine that is managed by a Virtual Machine Manager (VMM). Operating system 221 may comprise, for example, OFARS 110 modules. Applications 222 may include, for example, application 141 module(s) and application 142 module(s). Program data 225 may include, for example, activity and observer information 115 and limited observer activities 122 that may be used by OFARS 110.

Computing device 200 may have additional features or functionality, and additional interfaces to facilitate communications between the basic configuration 201 and any required devices and interfaces. For example, a bus/interface controller 240 may be used to facilitate communications between the basic configuration 201 and one or more data storage devices 250 via a storage interface bus 241. The data storage devices 250 may be removable storage devices 251, non-removable storage devices 252, or a combination thereof. Examples of removable storage and non-removable storage devices include magnetic disk devices such as flexible disk drives and hard-disk drives (HDD), optical disc drives such as compact disc (CD) drives or digital versatile disc (DVD) drives, solid state drives (SSD), and tape drives, to name a few. Example computer storage media may include volatile and nonvolatile, removable and non-removable media implemented in any method or technology for storage of information, such as computer readable instructions, data structures, program modules, or other data.

Level 1 cache 211, level 2 cache 212, system memory 220, removable storage 251, and non-removable storage devices 252 are all examples of computer storage media. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium that may be used to store the desired information and that may be accessed by computing device 200. Any such computer storage media may be part of device 200.

Computing device 200 may also include an interface bus 242 for facilitating communication from various interface devices (e.g., output interfaces, peripheral interfaces, and communication interfaces) to the basic configuration 201 via the bus/interface controller 240. Example output devices 260 include a graphics processing unit 261 and an audio processing unit 262, which may be configured to communicate to various external devices such as a display or speakers via one or more A/V ports 263. Example peripheral interfaces 270 may include a serial interface controller 271 or a parallel interface controller 272, which may be configured to communicate through either wired or wireless connections with external devices such as input devices (e.g., keyboard, mouse, pen, voice input device, touch input device, etc.) or other peripheral devices (e.g., printer, scanner, etc.) via one or more I/O ports 273. Other conventional I/O devices may be connected as well such as a mouse, keyboard, and so forth. An example communications device 280 includes a network controller 281, which may be arranged to facilitate communications with one or more other computing devices 290 over a network communication via one or more communication ports 282. Furthermore, communications devices 280 may be equipped to use short range wireless communications technologies, such as Wi-Fi, Bluetooth, Radio Frequency Identification (RFID), Near Field Communications (NFC) and the like to detect presence of other nearby devices, such as observer devices 161 and 162, illustrated in FIG. 1. In some embodiments, computing device 200 may be configured to use communications devices 280 to detect presence of one or more observer devices, e.g., observer devices 161, 162, as may be requested by observer information collector 113. Computing device 200 may be configured to count the number of detected observer devices. In some embodiments, computing device 200 may be configured to identify detected observer devices, e.g., by a device or observer identifier.

The computer storage media may be one example of a communication media. Communication media may typically be embodied by computer readable instructions, data structures, program modules, or other data in a modulated data signal, such as a carrier wave or other transport mechanism, and include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR), and other wireless media.

Computing device 200 may be implemented as a mobile device such as a smart phone or tablet. Computing device 200 may also be implemented as a personal or business use computer including both laptop computer and non-laptop computer configurations.

Figure 3:
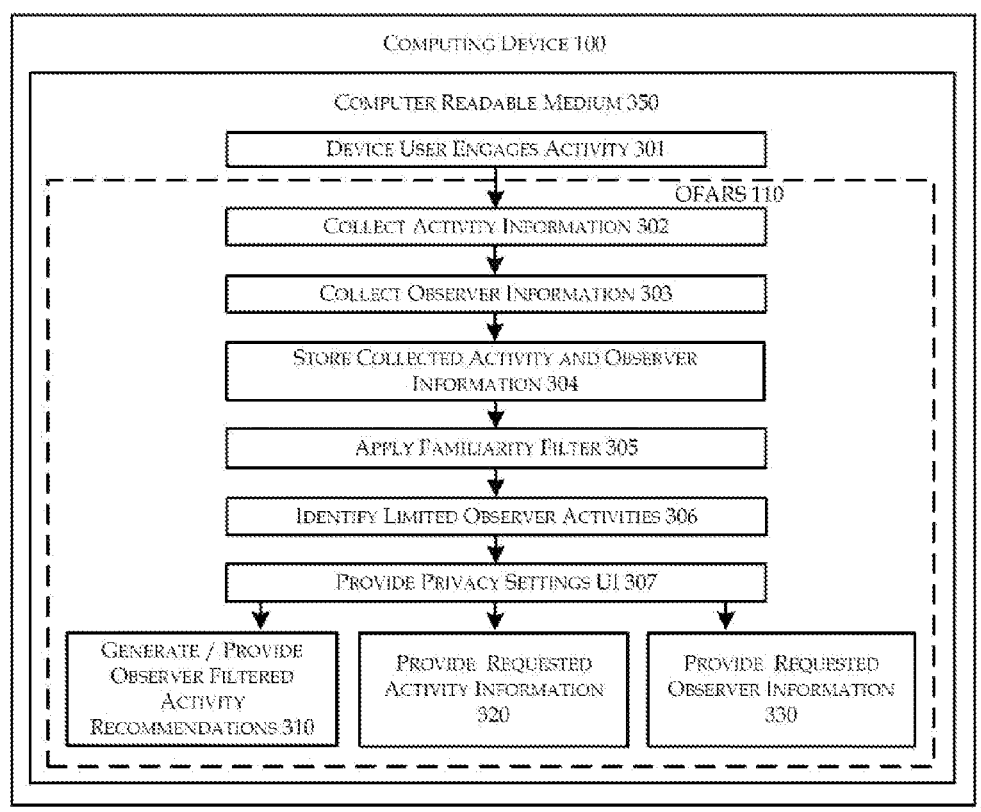
FIG. 3 is a flow diagram of example methods which may be performed by an observer filtered activity recommendation system.

FIG. 3 is a flow diagram of example methods which may be performed by an observer filtered activity recommendation system, arranged in accordance with at least some embodiments of the present disclosure. The example flow diagram may include one or more operations/modules as illustrated by blocks 301-307, 310, 320, and 330, which represent operations as may be performed in a method, functional modules in computing device 100 introduced in FIG. 1, and/or instructions as may be recorded on a computer readable medium 350.

In FIG. 3, blocks 301-307, 310, 320, and 330, are illustrated as including blocks being performed sequentially, e.g., with block 301 first and block 307 last in a sequence, followed by one or more of blocks 310, 320, or 330. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks.

FIG. 3 illustrates an example method by which computing device 100 may collect and store activity and observer information, and identify limited observer activities. Computing device 100 may use stored activity and observer information and/or identified limited observer activities to make observer filtered activity recommendations and/or to provide automated access to observer filtered activity information. Computing device 100 may use stored observer information to provide automated access to observer information.

At a "Device User Engages Activity" block 301, computing device 100 may be used by a device user in connection with an activity, or computing device 100 may detect a device user activity. For example, the device user may use computing device 100 to conduct an Internet search, to watch a video, to run an application, or to purchase a product. The device user may undertake any number of physical activities such as sitting, walking, driving, jogging, or bicycling, which may be detected by computing device 100. Block 301 may be followed by block 302.

At a "Collect Activity Information" block 302, computing device 100 may collect activity information for the activity engaged by the device user at block 301. Computing device 100 may collect activity information by storing activity information, such as an activity identifier, activity description, and/or data produced in the course of an activity. For example, when the activity comprises an Internet search, block 302 may store search terms entered by the device user as activity information. When the activity comprises watching a video, playing a video game, using a particular application, listening to music, or a product selection or purchase, block 302 may store title/name, description, and/or genre/category information as activity information. When the activity comprises a device user context activity determination, such as a determination regarding a device user's physical activity, block 302 may store the device user context activity determination as activity information. Block 302 may be followed by block 303.

At a "Collect Observer Information" block 303, computing device 100 may collect observer information comprising observers proximal to the device user when an activity is engaged by the device user at block 301. Block 303 may collect observer information according to any available technique, and this disclosure is not limited to any particular observer information collection technique.

In some embodiments, observer information collected at block 303 may comprise information reported via a mobile communications network. Mobile communications networks, such as third generation (3G), fourth generation (4G) networks, and other networks providing mobile voice and/or data communications may collect device location information. Block 303 may interact with one or more mobile communications network services to collect observer information, e.g., by requesting information about a number of observer devices, or identifiers of observer devices, within a predefined range from computing device 100. The predefined range may comprise, e.g., a sphere or circle with computing device 100 at its center and radius of anywhere from 2-30 meters. Observer devices may comprise any and all devices proximal to the device user, e.g., devices proximal to computing device 100 such as those within the predefined range.

In some embodiments, observer information collected at block 303 may comprise Wi-Fi communications information. Computing device 100 may comprise a Wi-Fi communication device. Block 303 may use the Wi-Fi communication device to detect Wi-Fi signals from observer devices within range of Wi-Fi communications. Block 303 may store Wi-Fi identification information for detected observer devices as observer information.

In some embodiments, observer information collected at block 303 may comprise information reported via a social network. For example, information posted by the device user to a social network may include activity information as well as identifications of persons present with the device user. An example social network post may include, e.g. "celebrating Joe's birthday at ice skating rink", and may identify Joe, Anne, and Tom. The activity, "celebrating Joe's birthday at ice skating rink" may be stored as activity information at block 302, and the identifications of persons present, e.g., Joe, Anne, and Tom may be stored as observer information at block 303.

In some embodiments, observer information collected at block 303 may comprise information reported via a location-based service. Location-based services generally identify locations of device users for marketing and/or providing location-specific information. Location-based services may therefore have information about computing devices as they enter and leave a particular location. Block 303 may interact with a location based service to collect observer information, e.g., by requesting information about a number of observer devices, or identifiers of observer devices, within range of the location-based service.

In some embodiments, observer information collected at block 303 may comprise Global Positioning System (GPS) information. For example, when computing device 100 has appropriate permissions, block 303 may request GPS information for any observer devices within a predefined range of computing device 100, such as the range described above. Alternatively, block 303 may request GPS information for device user contacts, and may compare returned GPS information with the current location of computing device 100 to determine any observer devices within a predefined range of computing device 100.

In some embodiments, observer information collected at block 303 may comprise information reported by the device user. For example, an observer identification UI may be presented to the device user, allowing the device user to enter observer names, e.g., by typing names or selecting names from a contacts list. Block 303 may store the observer information reported by the device user. In some embodiments, information reported by the device user may supplement or modify observer information collected using one or more other techniques.

In some embodiments, observer information collected at block 303 may comprise information reported via a sensor at a device user computing device. For example, an acoustic transducer or microphone may detect voices, and voice recognition may be used to identify observers. A camera may detect faces and face recognition may be used to identify observers. An NFC or Bluetooth wireless sensor/antenna may be used to detect wireless signals from observer devices and to identify observers, or at least observer devices, based on such detected wireless signals. Block 303 may be followed by block 304.

At a "Store Collected Activity and Observer Information" block 304, computing device 100 may store collected activity information and collected observer information, e.g., in a local computing device storage or at a remote server storage. In some embodiments, block 304 may be performed in multiple operations, e.g., an activity information storage operation and an observer information storage operation. Collected activity and observer information may be stored in a manner that correlates observer information with corresponding activity information. For example, observer information collected at or around a time an activity is performed may be stored in a same table row as the activity information collected for that activity. In some embodiments, activity information and observer information may be stored separately, and may be correlated by collection time—e.g., by storing activity information along with a time each activity is engaged, and by storing observer information along with a time each observer is detected. Observers corresponding to a particular activity may then be considered as those observers detected within some predetermined time window surrounding the activity. A time window may comprise, e.g., 1 minute to 1 hour. Block 304 may be followed by block 305.

At an "Apply Familiarity Filter" block 305, computing device 100 may apply a familiarity filter to collected observer information. Block 305 may be performed prior to block 304 or after block 304. The familiarity filter may generally filter observer information based on likely familiarity with the device user. For example, in some embodiments, the familiarity filter may discard unfamiliar observers from stored observer information while keeping familiar observers. In some embodiments, the familiarity filter may apply weights to rank the likely familiarity of observers. To determine familiarity of observers, embodiments may for example use the device user's social and professional contacts, machine learning based grouping, and/or frequency measurements to distinguish between anonymous random bystanders and people the device user knows. Block 305 may be followed by block 306.

At an "Identify Limited Observer Activities" block 306, computing device 100 may identify, based on the collected observer information, at least one limited observer activity among the collected activity information. Limited observer activities may be defined in several different ways. For example, in some embodiments, limited observer activities may comprise activities with no observers. In some embodiments, limited observer activities may comprise activities with few observers, such as one or fewer, two or fewer, etc. Limited observer activities with no observers and/or few observers may be referred to herein as "solitary type" limited observer activities.

In some embodiments, limited observer activities may comprise activities which are engaged in the presence of a limited set of observers, e.g., a limited set comprising some individual observers but not others, or a limited set comprising some observer types as may be ascertained from a common observer attribute, but not other observer types. Limited observer activities which are engaged in the presence of a limited set of observers are referred to herein as "group type" limited observer activities.

Block 306 may identify solitary type limited observer activities, group type limited observer activities, or both. Embodiments may identify solitary type limited observer activities, e.g., by identifying activities within the stored activity and observer information which comprise fewer than a predetermined number of observers over a plurality of instances of the activity. Embodiments may identify group type limited observer activities, e.g., by identifying activities within the stored activity and observer information which comprise observers within a limited set of observers corresponding to a group type limited observer activity, over a plurality of instances of the group type limited observer activity. Block 306 may be followed by block 307.

At a "Provide Privacy Settings UI" block 307, computing device 100 may provide a privacy settings UI adapted to receive device user privacy settings inputs. An example privacy settings UI is illustrated in FIG. 7.

Figure 7:
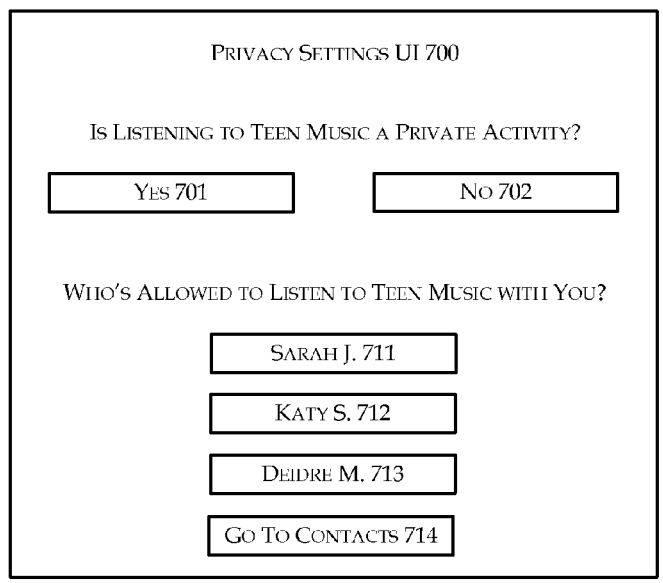
FIG. 7 illustrates an example privacy settings UI, all arranged in accordance with at least some embodiments of the present disclosure.

FIG. 7 illustrates an example privacy settings UI, arranged in accordance with at least some embodiments of the present disclosure. In some embodiments, privacy settings UI 700 may ask the device user whether limited observer activities identified at block 306 are correctly identified as limited observer activities. Device user confirmation may be used as part of limited activity identification. For example, privacy settings UI 700 includes a control 701 and a control 702, adapted to confirm or deny an activity as a limited observer activity. Device user selection of control 701 may confirm listening to teen music is a limited observer (or private) activity, while device user selection of control 702 may deny listening to teen music is a limited observer (or private) activity.

In some embodiments, privacy settings UI 700 may comprise controls adapted to receive device user indications of allowed observers corresponding to limited observer activities. For example, privacy settings UI 700 may comprise a control 711, a control 712, and a control 713, adapted to identify observers previously present when an activity was engaged, and to ask whether such previous observers are allowed. In some embodiments, privacy settings UI 700 may allow the device user to specify additional observers, e.g., via a control 714. Privacy settings UI 700 may optionally also include additional features, such as a control to request no activity recommendations for identified limited observer activities. Block 307 may be followed by any of blocks block 310, 320, and/or 330.

Returning to FIG. 3, at a "Generate/Provide Observer Filtered Activity Recommendations" block 310, computing device 100 may generate, for the device user, observer filtered activity recommendations corresponding to identified limited observer activities. Observer filtered activity recommendations may comprise, e.g., advertisements for products or services associated with limited observer activities. Observer filtered activity recommendations may be generated, e.g., by retrieving targeted advertising content.

Generated observer filtered activity recommendations may be provided to the device user, e.g., by displaying the observer filtered activity recommendations on a computing device display. In some embodiments, block 310 may time observer filtered activity recommendations to occur when the device user is in private or in presence of observers within a limited set of observers corresponding a limited observer activity. As noted herein, limited observer activities may generally correspond to activities associated with heightened emotional response. Activity recommendations corresponding to limited observer activities may therefore command more device user attention than other activity recommendations. Block 310 is discussed further in connection with FIG. 4.

At a "Provide Requested Activity Information" block 320, computing device 100 may provide requested activity information in response to activity information requests, e.g., through activity API 132. The provided activity information may be subject to restriction when it comprises limited observer activity information, as described further in connection with FIG. 5.

At a "Provide Requested Observer Information" block 330, computing device 100 may provide requested observer information in response to observer information requests, e.g., through observer API 133. The provided observer information may include observer information from observer collection events, or the provided observer information may include an indication of whether current observer information matches stored observer information, as described further in connection with FIGS. 6A and 6B.

Figure 4:
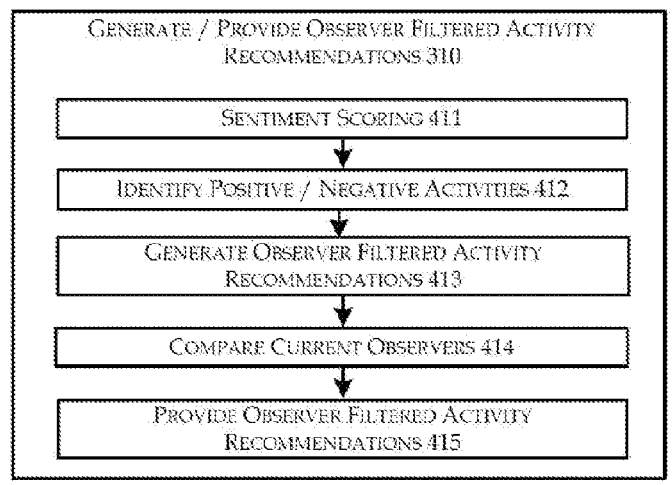
FIG. 4 is a flow diagram illustrating an example method configured to generate and provide observer filtered activity recommendations.

FIG. 4 is a flow diagram illustrating an example method configured to generate and provide observer filtered activity recommendations, arranged in accordance with at least some embodiments of the present disclosure. The example flow diagram may include one or more operations/modules of "Generate/Provide Observer Filtered Activity Recommendations" block 310, introduced in FIG. 3. The operations/modules in FIG. 4 are illustrated by blocks 411-415, which represent operations as may be performed in a method, functional modules in computing device 100 illustrated in FIG. 1, and/or instructions as may be recorded on computer readable medium 350 illustrated in FIG. 3.

In FIG. 4, blocks 411-415 are illustrated as including blocks being performed sequentially, e.g., with block 411 first and block 415 last. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks.

FIG. 4 illustrates an example method by which computing device 100 may generate and provide observer filtered activity recommendations at block 310. Block 310 may generate, for the device user, observer filtered activity recommendations corresponding to identified limited observer activities. Block 310 may provide generated observer filtered activity recommendations to the device user, e.g., by displaying the observer filtered activity recommendations on a computing device display. In some embodiments, block 310 may time observer filtered activity recommendations to occur when the device user is in private or in presence of observers within a limited set of observers corresponding a limited observer activity.

At a "Sentiment Scoring" block 411, computing device 100 may retrieve and store sentiment information for activities. In some embodiments, block 411 may retrieve and store sentiment information for all activities identified in stored activity and observer information 115. For example, FIG. 1 illustrates activity information collector providing activity information to sentiment scorer 112, and sentiment scorer 112 providing, e.g., sentiment-scored activity information into stored activity and observer information 115. In some embodiments, block 411 may retrieve and store sentiment information for limited observer activities 122 identified at block 306. For example, sentiment scorer 112 may be configured to sentiment score limited observer activities 122. Sentiment information may indicate, e.g., a positive or negative sentiment score for each identified limited observer activity.

Block 411 may retrieve sentiment data from any of a variety of sources. In some embodiments, block 411 may retrieve sentiment information from a network sentiment information service adapted to support embodiments of this disclosure. An example network sentiment information service may receive activity identification information from computing device 100, and may return sentiment information corresponding to the received activity information. In some embodiments, block 411 may request device user input including sentiment information for the device user's limited observer activities.

In some embodiments, block 411 may comprise "max and min dual population" sentiment scoring which may keep track of bimodal results for activity terms to capture the possibility that an activity may be associated with both positive and negative sentiment. Sentiment scoring of text and concepts is available as a service from a variety of sources. Sentiment analysis may be based on language research and may for example operate by calculating posterior probabilities that expressive language used may be associated with typical different sentiment corpora to provide a score along axes of positive or negative associations. Some concepts have strong scores along both positive and negative axes (e.g. music groups, controversial opinions) which are normally resolved in favor of a higher weight. In max and min scoring approaches, both max and min scores may be kept to capture the possibility of something being either a positive or negative activity. In such situations an activity may be considered controversial or secondary considerations may be used to judge the users feelings on the matter.

Limited observer activities with both positive and negative possible sentiment scores can be tracked in an indeterminate state and additionally resolved using other indicators. For example if it is unclear whether a limited observer activity is positive or negative, OFARS 110 may be configured to activity recommendations to stop the limited observer activity, and OFARS 110 may track whether such articles or advertising are selected by device user 150. If device user 150 selects, for example, to read an article on stopping a limited observer activity, OFARS 110 may categorize the limited observer activity as a negative activity.

Both positive and negative limited observer activities present significant opportunities for OFARS 110 and/or context based systems adapted to use OFARS 110 to add value for device users. Advertising for positive "guilty pleasure" type limited observer activities at quiet alone moments is likely to be particularly effective. Advertising traction for self-management services for managing negative activities also has high value. In addition to advertising type activity recommendations, OFARS 110 may be used to recommend activities such as the use of behavior change applications and the like. Block 411 may be followed by block 412.

At an "Identify Positive/Negative Activities" block 412, computing device 100 may identify limited observer activities as positive activities or negative activities, based on sentiment scores applied at block 411, in order to configure block 413 to generate appropriate activity recommendations. Activity recommendations for positive activities may comprise, e.g., recommendations to engage in the positive activities. Activity recommendations for negative activities may comprise, e.g., recommendations to assist in preventing the negative activities. Block 412 may be followed by block 413.

At a "Generate Observer Filtered Activity Recommendations" block 413, computing device 100 may generate activity recommendations for identified limited observer activities. In some embodiments, block 413 may generate activity recommendations by retrieving activity recommendations from a network activity recommendation service or network advertising service. For example, block 413 may request, from an advertising service, activity recommendations for one or more limited observer activities. The limited observer activities may, but need not be identified as limited observer activities in the request. In embodiments comprising sentiment scoring, network activity recommendation service requests may furthermore identify limited observer activities as positive or negative sentiment activities, to retrieve appropriately tailored activity recommendations. In some embodiments, block 413 may be followed by block 415, without timing observer filtered activity recommendations based on current observers. In some embodiments, block 413 may be followed by blocks 414 and 415, to time observer filtered activity recommendations in a manner that is sensitive to current observers.

At a "Compare Current Observers" block 414, computing device 100 may determine current observers near computing device 100, and computing device 100 may compare the current observers to observers "allowed" for observer filtered activity recommendations relating to a limited observer activity. For example, consider an activity recommendation relating to smoking. Using the techniques described herein, smoking may be identified as a limited observer activity for a device user who smokes alone, or for a device user who smokes in the presence of a few select observers. For a device user who smokes alone, when block 414 compares current observers to observers "allowed" for smoking-related observer filtered activity recommendations, block 414 may determine that the comparison is false, or that there is no match, when any current observers are detected. Alternatively, for a device user who smokes alone, block 414 may determine that the comparison is true, or that there is a match, when no current observers are detected.

For a device user who smokes in the presence of a few select observers, when block 414 compares current observers to observers "allowed" for smoking-related observer filtered activity recommendations, block 414 may determine that the comparison is false, or that there is no match, when any current observers are detected who are not within those few select observers with whom the device user smokes. Alternatively, block 414 may determine that the comparison is true, or that there is a match, when no current observers are detected beyond those few select observers with whom the device user smokes. Block 414 may therefore be used to enable timing of observer filtered activity recommendations to occur when the device user is in private or in presence of observers within a limited set of observers corresponding to a limited observer activity. Block 414 may be followed by block 415.

At a "Provide Observer Filtered Activity Recommendations" block 415, computing device 100 may provide observer filtered activity recommendations generated at block 413, optionally when current observer conditions allow, or when the observer comparison is true, as determined at block 414. Observer filtered activity recommendations may be provided, e.g., by displaying advertisements or other activity recommendations, e.g., as a sidebar, pop-up, search result, other visual display, or otherwise from within an application. Some applications, such as personal assistants, may make recommendations based in part on device user preferences, and observer filtered activity recommendations may be displayed as personal assistant activity recommendations. Observer filtered activity recommendations may also be provided as emails, text messages, audio messages, phone calls or other items. In embodiments which time observer filtered activity recommendations based in part on current observers, block 415 may cooperate with block 413 to provide observer filtered activity recommendations at opportune times, based on detected current observers.

Figure 5:
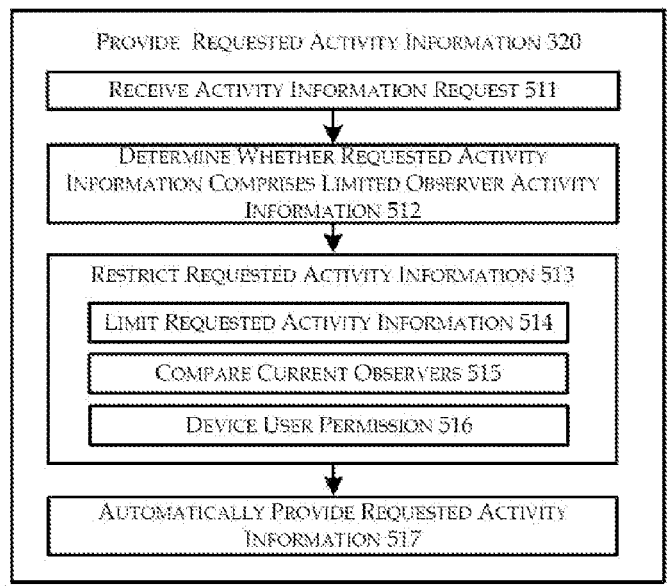
FIG. 5 is a flow diagram of an example method to provide automated access to observer filtered activity information.

FIG. 5 is a flow diagram of an example method to provide automated access to observer filtered activity information, arranged in accordance with at least some embodiments of the present disclosure. The example flow diagram may include one or more operations/modules of "Provide Requested Activity Information" block 320, introduced in FIG. 3. The operations/modules in FIG. 5 are illustrated by blocks 511-517, which represent operations as may be performed in a method, functional modules in computing device 100 illustrated in FIG. 1, and/or instructions as may be recorded on computer readable medium 350 illustrated in FIG. 3.

In FIG. 5, blocks 511-517 are illustrated as including blocks being performed sequentially, e.g., with block 511 first and block 517 last. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks.

FIG. 5 illustrates an example method by which computing device 100 may provide requested activity information in response to activity information requests, e.g., at block 320 as illustrated in FIG. 3, wherein block 320 may apply activity API 132 illustrated in FIG. 1. In general, block 320 may determine whether requested activity information is subject to restriction, restrict the requested activity information, and provide the requested activity information as restricted.

At a "Receive Activity Information Request" block 511, computing device 100 may receive a request for activity information. For example, in some embodiments, OFARS 110 may receive an activity information request at activity API 132. The activity information request may comprise, e.g., a request from an application installed at computing device 100. Block 511 may be followed by block 512.

At a "Determine Whether Requested Activity Information Comprises Limited Observer Activity Information" block 512, computing device 100 may determine, in response to the request received at block 511, whether the requested activity information comprises a limited observer activity. Block 512 may for example compare the requested activity information with limited observer activities 122. If the requested activity information includes any of limited observer activities 122, then the requested activity information comprises a limited observer activity. If the requested activity information does not include any of limited observer activities 122, then the requested activity information does not comprise a limited observer activity. Block 512 may be followed by block 513.

At a "Restrict Requested Activity Information" block 513, computing device 100 may restrict activity information provided in response to the request received at block 511 when the requested activity information comprises a limited observer activity, as determined at block 512. When determined at block 512 that requested activity information does not include any of limited observer activities 122, block 513 may be omitted or may pass directly to block 517 without performing any restriction operations. When determined at block 512 that requested activity information does include one or more limited observer activities 122, block 513 may restrict activity information according to any of the example restriction operations illustrated at blocks 514, 515, and/or 516.

At a "Limit Requested Activity Information" block 514, computing device 100 may limit activity information provided in response to the request received at block 511 by removing any limited observer activities 122 from activity information provided in response to the request. For example, in the scenario of an e-reader that requests past reading activities, and where political genre reading is identified as a limited observer activity, block 514 may limit activity information provided in response to the e-reader request by removing political genre reading activities. Meanwhile, block 514 may allow activity information responsive to the request and not comprising limited observer activities 122, e.g., block 514 may allow activities such as reading work-related documents. In some embodiments, block 514 may configure limited observer activities 122 to be displayed differently from other activity information. For example, limited observer activity information may be accessible via an icon which the device user may select at his or her discretion, thereby protecting limited observer activity information from unwanted display in the presence of observers, by giving the device user a degree of control over the display of limited observer activities.

At a "Compare Current Observers" block 515, computing device 100 may determine current observer information, and computing device 100 may compare the current observer information to observer information corresponding to any limited observer activities in the requested activity information, e.g., as described above in connection with block 414. Block 515 may allow for returning unrestricted activity information when current observers match allowed observers, while restricting returned activity information when current observers do not match allowed observers. Whether or not current observers match allowed observers, embodiments that compare current observers are effective to restrict activity information, by subjecting returned activity information to current observer comparison. In some embodiments, block 515 may for example avoid certain viewing suggestions on a TV when observers are present, to avoid the observers seeing private tastes in a TV interface visible to all.

At a "Device User Permission" block 516, computing device 100 may, e.g., restrict activity information provided in response to the request from block 511 by displaying a permission UI comprising a request for device user permission to provide the requested activity information in response to the request. Block 516 may restrict returned activity information when device user permission is not granted via the permission UI, while block 516 may allow returning unrestricted activity information when device user permission is granted via the permission UI. Whether or not device user permission is granted via the permission UI, embodiments that present the permission UI effectively restrict activity information by subjecting returned activity information to device user permission.

At an "Automatically Provide Requested Activity Information" block 517, computing device 100 may automatically provide the requested activity information in response to the request received at block 511, subject to restrictions as applied at block 513 when the requested activity information comprises a limited observer activity, as determined at block 512. Automatically providing the requested activity may be accomplished, e.g., by operation of activity API 132 or other automated process.

Applications may make use of API 132, for example, to avoid making inappropriate activity recommendations. Such protections are particularly interesting if one considers the Bring-Your-Own-Device (BYOD) to work trend and the fact that many employers may have applications on employee devices. An employer may want to implement observer filtered activity recommendations as described herein to avoid unwanted information about an employee's limited observer activities. Some embodiments may protect employee privacy, making employees more likely to accept employer-provided contextual applications while also protecting the employer from lawsuits related to inappropriate discovery, storage or use of private employee information.

Figure 6A:
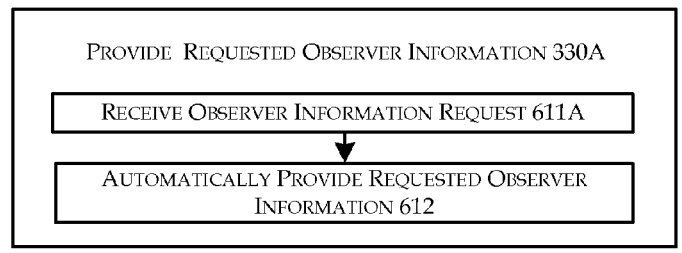
FIG. 6A is a flow diagram of an example method to provide observer information.

FIG. 6A is a flow diagram of an example method to provide observer information, arranged in accordance with at least some embodiments of the present disclosure. The example flow diagram may include one or more operations/modules of "Provide Requested Observer Information" block 330A, wherein block 330A comprises an example embodiment of block 330 introduced in FIG. 3. The operations/modules in FIG. 6A are illustrated by blocks 611A-612, which represent operations as may be performed in a method, functional modules in computing device 100 illustrated in FIG. 1, and/or instructions as may be recorded on computer readable medium 350 illustrated in FIG. 3.

In FIG. 6A, blocks 611A-612 are illustrated as including blocks being performed sequentially, e.g., with block 611A first and block 612 last. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks.

Figure 6B:
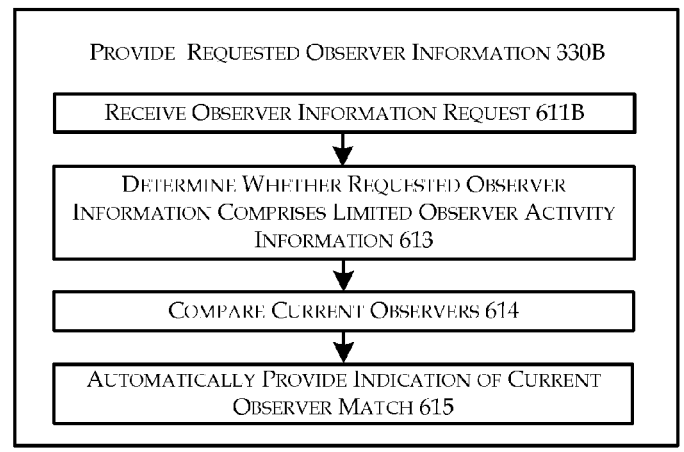
FIG. 6B is a flow diagram of an example method to provide observer information.

FIG. 6A and FIG. 6B illustrate example methods by which computing device 100 may provide requested observer information in response to observer information requests, e.g., at block 330 as illustrated in FIG. 3, wherein block 330 may apply observer API 133 as illustrated in FIG. 1. Block 330 may comprise block 330A as illustrated in FIG. 6A and/or block 330B as illustrated in FIG. 6B. Block 330A may receive and respond to a first type of observer information requests, referred to herein as "observer data" requests, and block 330B may receive and respond to a second type of observer information requests, referred to herein as "observer approval" requests.

FIG. 6A and FIG. 6B may be applied in connection with embodiments comprising OFARS 110, however, it is noted that some aspects of OFARS 110 may not be necessary in connection with some embodiments of FIG. 6A and FIG. 6B. For example, activity information collector 111 and limited observer activity identifier 120 may or may not be included in embodiments of OFARS 110 configured to support observer information requests according to FIG. 6A and FIG. 6B.

In embodiments of OFARS 110 configured to support observer information requests according to FIG. 6A and FIG. 6B, OFARS 110 may collect observer information comprising identifications of observers proximal to device user 150 at a plurality of observer collection events. Observer collection events may comprise, e.g., activity-based observer collection events, periodic observer collection events, and/or requested observer collection events. Activity-based observer collection events may correspond to device user activities, e.g., for which activity information may be collected by activity information collector 111. Periodic observer collection events may comprise, e.g., observer collection events performed at periodic time intervals, such as every minute, every half hour, every hour, etc. Requested observer collection events may comprise, e.g., observer collection requests received at observer API 133, e.g., from application 142. In some embodiments, observer collection events may be triggered by detected changes in observers surrounding computing device 100 and/or detected changes in familiar observers surrounding computing device 100, as may be detected using the observer detection and/or familiarity filter technologies described herein.

In embodiments of OFARS 110 configured to support observer information requests according to FIG. 6A and FIG. 6B, OFARS 110 may be configured to store collected observer information from the plurality of observer collection events. OFARS 110 may, but need not necessarily, collect and store activity information corresponding to each of the plurality of observer collection events to produce activity and observer information 115. When OFARS 110 stores activity and observer information 115, limited observer activities may be identified as described herein.

At a "Receive Observer Information Request" block 611A, computing device 100 may receive an "observer data" request, e.g., a request from application 142 received at observer API 133. The observer data request may comprise a request for observers present at one or more specific observer collection events, or at observer collection events of a specified type. For example, the observer data request may comprise a request for observer data from all observer collection events in the week (or other time interval) preceding the observer data request; the observer data request may comprise a request for observer data from a specific observer collection event; the observer data request may comprise a request for observer data from all observer collection events requested by application 142; or the observer data request may comprise a request for observer data from all observer collection events corresponding to a particular activity.

At an "Automatically Provide Requested Observer Information" block 612, computing device 100 may automatically provide, in response to the observer information request received at block 611A, requested observer information corresponding to the observer collection event(s) identified in the observer information request. Observer API 133 may be adapted to provide the requested observer information, such as identifiers for observers or observer devices 161, 162 detected at each observer collection event specified in an observer information request. Where numbers of observers are collected without observer identification, observer API 133 may be adapted to provide number(s) of observers present at each observer collection event specified in an observer information request. Application 142 may use returned observer information for any purpose, e.g., to perform analysis of observer and activity correlations to identify limited observer activities and/or to make observer filtered activity recommendations as described herein. In some embodiments, block 612 may automatically provide, in response to the observer data request received at block 611A, identifications of current observers along with requested observer information.

FIG. 6B is a flow diagram of an example method to provide observer information, arranged in accordance with at least some embodiments of the present disclosure. The example flow diagram may include one or more operations/modules of "Provide Requested Observer Information" block 330B, wherein block 330B comprises an example embodiment of block 330 introduced in FIG. 3. The operations/modules in FIG. 6B are illustrated by blocks 611B-615, which represent operations as may be performed in a method, functional modules in computing device 100 illustrated in FIG. 1, and/or instructions as may be recorded on computer readable medium 350 illustrated in FIG. 3.

In FIG. 6B, blocks 611B-615 are illustrated as including blocks being performed sequentially, e.g., with block 611B first and block 615 last. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks.

FIG. 6B illustrates an example method by which computing device 100 may receive and respond to "observer approval" requests. In a "Receive Observer Information Request" block 611B, computing device 100 may receive an observer approval request, e.g., a request from application 142 received at observer API 133. The observer approval request may comprise a request to indicate whether current observer information matches stored observer information corresponding to one or more specific observer collection events, or corresponding to observer collection events of a specified type. For example, an observer approval request received at block 611B may comprise a request to indicate whether current observer information matches stored observer information for specific observer collection events, such as one or more requested observer collection events previously requested by application 142. Another example observer approval request may comprise a request to indicate whether current observer information matches stored observer information corresponding to a particular activity, such as the use of application 142 by device user 150. Block 611B may optionally be followed by block 613. Otherwise, block 611B may be followed by block 614.

At a "Determine Whether Requested Observer Information Comprises Limited Observer Activity Information" block 613, computing device 100 may optionally determine whether requested observer information comprises limited observer activity information. For example, block 613 may determine whether observer collection events specified in the observer approval request correspond to identified limited observer activities. If so, then block 613 may be followed by block 614. If not, then block 613 may be followed by block 615. The application of block 613 may therefore filter for limited observer activities, to provide observer approvals for any observer approval requests not relating to limited observer activities, and to proceed with comparing current observers, at block 614, for any observer approval requests relating to limited observer activities.

At a "Compare Current Observers" block 614, computing device 100 may collect current observer information, and may compare the current observer information to stored observer information for the observer collection events specified in the observer approval request as received at block 611B. In embodiments comprising block 613, block 614 may compare the current observer information to the stored observer information for any limited observer activities identified at block 613. Block 614 may be followed by block 615.

At an "Automatically Provide Indication of Current Observer Match" block 615, computing device 100 may automatically provide, in response to the observer approval type observer information request received at block 611B, an indication of whether current observer information matches stored observer information corresponding to the one or more observer collection events identified in the observer approval request. For example, observer API 133 may automatically return indications to application 142 in response to observer approval requests from application 142.

In embodiments including block 613, block 615 may provide a "true" indication, i.e., observer approval, regardless of current observers when the observer approval request does not involve observer information corresponding to limited observer activities. Block 615 may also provide a "true" indication when the observer approval request does involve observer information corresponding to limited observer activities and when current observers match the observers for any identified limited observer activities. Block 615 may provide a "false" indication when the observer approval request does involve observer information corresponding to limited observer activities and when current observers do not match the observers for an identified limited observer activity.

In embodiments not including block 613, block 615 may compare current observers at block 614 for all observer approval requests received at block 611B, regardless of whether observer approval requests relate to observer information for limited observer activities. Block 615 may provide a "true" indication when current observers match the observers for collection events identified in the observer approval request, and block 615 may provide a "false" indication when current observers do not match the observers for collection events identified in the observer approval request. In some embodiments, outlier observer information may be removed from collected observer information prior to comparing collected observer information with current observers.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disc (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely examples and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly inter-actable and/or wirelessly interacting components and/or logically interacting and/or logically inter-actable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain example techniques have been described and shown herein using various methods, devices and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

The invention claimed is:

1. A method to make observer filtered activity recommendations, comprising:
    collecting, by a computing device, activity information for one or more activities engaged by a device user;
    collecting, by the computing device, observer information comprising observers proximal to the device user when each of the one or more activities is engaged by the device user;
    storing, by the computing device, collected activity information and collected observer information;
    identifying, by the computing device, based on the collected observer information, at least one limited observer activity among the collected activity information, wherein the limited observer activity comprises:
        a solitary type limited observer activity, wherein collected observer information for the solitary type limited observer activity comprises fewer than a predetermined number of observers over a plurality of instances of the solitary type limited observer activity in the collected activity information; or
        a group type limited observer activity, wherein collected observer information for the group type limited observer activity comprises observers within a limited set of observers corresponding to the group type limited observer activity, over a plurality of instances of the group type limited observer activity in the collected activity information; and generating, by the computing device, for the device user, at least one observer filtered activity recommendation corresponding to the at least one limited observer activity.

2. The method of claim 1, wherein the collected activity information comprises one or more device user context activity determinations based on data collected at a device user computing device.

3. The method of claim 1, wherein the collected activity information comprises device user product selection information.

4. The method of claim 1, wherein the collected observer information comprises one or more of:
   information reported via a mobile communications network;
   Wi-Fi communications information;
   information reported via a social network;
   information reported via a location-based service;
   Global Positioning System (GPS) information;
   information reported by the device user; or
   information reported via a sensor at a device user computing device.

5. The method of claim 1, further comprising applying, by the computing device, a familiarity filter to collected observer information.

6. The method of claim 1, further comprising storing, by the computing device, sentiment information for the at least one limited observer activity, the sentiment information indicating a positive or negative sentiment score for the at least one limited observer activity.

7. The method of claim 6, further comprising:
   identifying, by the computing device, the at least one limited observer activity as a positive activity with a positive sentiment score, wherein the at least one observer filtered activity recommendation comprises a recommendation to engage in the positive activity; or
   identifying, by the computing device, the at least one limited observer activity as a negative activity with a negative sentiment score, wherein the at least one observer filtered activity recommendation comprises a recommendation to assist in preventing the negative activity.

8. The method of claim 1, wherein the observer filtered activity recommendation comprises an advertisement for a product or service associated with the at least one limited observer activity.

9. The method of claim 1, further comprising timing the at least one observer filtered activity recommendation to occur when the device user is in private or in presence of observers within the limited set of observers corresponding to the group type limited observer activity.

10. The method of claim 1, further comprising providing, by the computing device, a privacy settings User Interface (UI), the privacy settings UI comprising at least one control adapted to receive a device user indication of allowed observers corresponding to the at least one limited observer activity.

11. A non-transitory computer readable storage medium having computer executable instructions executable by a processor, the instructions that, when executed by the processor, implement an observer filtered activity recommendation system which causes the processor to:
   collect activity information for one or more activities engaged by a device user;
   collect observer information comprising observers proximal to the device user when each of the one or more activities is engaged by the device user;
   store collected activity information and collected observer information;
   identify, based on the collected observer information, at least one limited observer activity among the collected activity information, wherein the limited observer activity comprises:
      a solitary type limited observer activity, wherein collected observer information for the solitary type limited observer activity comprises fewer than a predetermined number of observers over a plurality of instances of the solitary type limited observer activity in the collected activity information; or
      a group type limited observer activity, wherein collected observer information for the group type limited observer activity comprises observers within a limited set of observers corresponding to the group type limited observer activity, over a plurality of instances of the group type limited observer activity in the collected activity information; and
   generate, for the device user, at least one observer filtered activity recommendation corresponding to the at least one limited observer activity.

12. The non-transitory computer readable storage medium of claim 11, wherein the collected activity information comprises one or more device user context activity determinations based on data collected at a device user computing device.

13. The non-transitory computer readable storage medium of claim 11, wherein the collected activity information comprises device user product selection information.

14. The non-transitory computer readable storage medium of claim 11, wherein the collected observer information comprises one or more of:
   information reported via a mobile communications network;
   Wi-Fi communications information;
   information reported via a social network;
   information reported via a location-based service;
   Global Positioning System (GPS) information;
   information reported by the device user; or
   information reported via a sensor at a device user computing device.

15. The non-transitory computer readable storage medium of claim 11, further comprising instructions that cause the processor to apply a familiarity filter to collected observer information.

16. The non-transitory computer readable storage medium of claim 11, further comprising instructions that cause the processor to store sentiment information for the at least one limited observer activity, the sentiment information indicating a positive or negative sentiment score for the at least one limited observer activity.

17. The non-transitory computer readable storage medium of claim 16, further comprising instructions that cause the processor to:
   identify the at least one limited observer activity as a positive activity with a positive sentiment score, wherein the at least one observer filtered activity recommendation comprises a recommendation to engage in the positive activity; or
   identify the at least one limited observer activity as a negative activity with a negative sentiment score, wherein the at least one observer filtered activity recommendation comprises a recommendation to assist in preventing the negative activity.

18. The non-transitory computer readable storage medium of claim 11, wherein the observer filtered activity recommendation comprises an advertisement for a product or service associated with the at least one limited observer activity.

19. The non-transitory computer readable storage medium of claim 11, further comprising instructions that cause the processor to time the at least one observer filtered activity recommendation to occur when the device user is in private or in presence of observers within the limited set of observers corresponding to the group type limited observer activity.

20. The non-transitory computer readable storage medium of claim 11, further comprising instructions that cause the processor to provide a privacy settings User Interface (UI), the privacy settings UI comprising at least one control adapted to receive a device user indication of allowed observers corresponding to the at least one limited observer activity.

21. A computing device adapted to implement an observer filtered activity recommendation system, the computing device comprising:
    a processor;
    a memory; and
    an observer filtered activity recommendation system stored in the memory and executable by the processor, wherein the observer filtered activity recommendation system is configured to:
        collect activity information for one or more activities engaged by a device user;
        collect observer information comprising observers proximal to the device user when each of the one or more activities is engaged by the device user;
        store collected activity information and collected observer information;
        identify, based on the collected observer information, at least one limited observer activity among the collected activity information, wherein the limited observer activity comprises:
            a solitary type limited observer activity, wherein collected observer information for the solitary type limited observer activity comprises fewer than a predetermined number of observers over a plurality of instances of the solitary type limited observer activity in the collected activity information; or
            a group type limited observer activity, wherein collected observer information for the group type limited observer activity comprises observers within a limited set of observers corresponding to the group type limited observer activity, over a plurality of instances of the group type limited observer activity in the collected activity information; and
        generate, for the device user, at least one observer filtered activity recommendation corresponding to the at least one limited observer activity.

22. The computing device of claim 21, wherein the collected activity information comprises one or more device user context activity determinations based on data collected at a device user computing device.

23. The computing device of claim 21, wherein the collected activity information comprises device user product selection information.

24. The computing device of claim 21, wherein the collected observer information comprises one or more of:
    information reported via a mobile communications network;
    Wi-Fi communications information;
    information reported via a social network;
    information reported via a location-based service;
    Global Positioning System (GPS) information;
    information reported by the device user; or
    information reported via a sensor at a device user computing device.

25. The computing device of claim 21, wherein the observer filtered activity recommendation system is configured to apply a familiarity filter to collected observer information.

26. The computing device of claim 21, wherein the observer filtered activity recommendation system is configured to store sentiment information for the at least one limited observer activity, the sentiment information indicating a positive or negative sentiment score for the at least one limited observer activity.

27. The computing device of claim 26, wherein the observer filtered activity recommendation system is configured to:
    identify the at least one limited observer activity as a positive activity with a positive sentiment score, wherein the at least one observer filtered activity recommendation comprises a recommendation to engage in the positive activity; or
    identify the at least one limited observer activity as a negative activity with a negative sentiment score, wherein the at least one observer filtered activity recommendation comprises a recommendation to assist in preventing the negative activity.

28. The computing device of claim 21, wherein the observer filtered activity recommendation comprises an advertisement for a product or service associated with the at least one limited observer activity.

29. The computing device of claim 21, wherein the observer filtered activity recommendation system is configured to time the at least one observer filtered activity recommendation to occur when the device user is in private or in presence of observers within the limited set of observers corresponding to the group type limited observer activity.

30. The computing device of claim 21, wherein the observer filtered activity recommendation system is configured to provide a privacy settings User Interface (UI), the privacy settings UI comprising at least one control adapted to receive a device user indication of allowed observers corresponding to the at least one limited observer activity.

* * * * *